United States Patent
Stanze et al.

(10) Patent No.: US 11,096,067 B2
(45) Date of Patent: Aug. 17, 2021

(54) METHOD FOR COORDINATION OF TRANSMISSION FROM BASE STATIONS, AND A BASE STATION THEREFOR

(71) Applicant: Alcatel Lucent, Boulogne Billancourt (FR)

(72) Inventors: Oliver Stanze, Stuttgart (DE); Andreas Weber, Stuttgart (DE)

(73) Assignee: Alcatel Lucent, Nozay (FR)

( * ) Notice: Subject to any disclaimer, the term of this patent is extended or adjusted under 35 U.S.C. 154(b) by 1464 days.

(21) Appl. No.: 14/384,931

(22) PCT Filed: Feb. 5, 2013

(86) PCT No.: PCT/EP2013/052205
§ 371 (c)(1),
(2) Date: Sep. 12, 2014

(87) PCT Pub. No.: WO2013/135437
PCT Pub. Date: Sep. 19, 2013

(65) Prior Publication Data
US 2015/0029889 A1    Jan. 29, 2015

(30) Foreign Application Priority Data

Mar. 15, 2012  (EP) .................................. 12305297

(51) Int. Cl.
*H04W 24/00* (2009.01)
*H04W 16/32* (2009.01)
(Continued)

(52) U.S. Cl.
CPC ........... *H04W 24/00* (2013.01); *H04W 16/32* (2013.01); *H04W 72/0426* (2013.01);
(Continued)

(58) Field of Classification Search
None
See application file for complete search history.

(56) References Cited

U.S. PATENT DOCUMENTS

2009/0257390 A1   10/2009   Ji et al.
2010/0278132 A1   11/2010   Palanki et al.
(Continued)

FOREIGN PATENT DOCUMENTS

CN      102007808 A       4/2011
EP      2 291 043 A1      3/2011
(Continued)

OTHER PUBLICATIONS

PCT Pat. App. No. PCT/EP2013/052205, Written Opinion of the International Searching Authority, dated Apr. 18, 2013, 6 pp.
(Continued)

*Primary Examiner* — Hassan Kizou
*Assistant Examiner* — Hector Reyes
(74) *Attorney, Agent, or Firm* — Fay Sharpe LLP

(57) ABSTRACT

The invention concerns a method for coordination of transmission from a first and at least one further base station (M1, P1), wherein said first base station (M1, P1) evaluates the usage by said at least one further base station (M1, P1) of at least one subframe, and said first base station (M1, P1) uses said at least one subframe for transmission dependent on the evaluated usage by said at least one further base station (M1, P1) of said at least one subframe, and a base station therefore.

19 Claims, 3 Drawing Sheets

(51) Int. Cl.
  *H04W 72/04* (2009.01)
  *H04L 1/00* (2006.01)
  *H04W 28/06* (2009.01)
  *H04W 92/20* (2009.01)
  *H04W 88/08* (2009.01)

(52) U.S. Cl.
  CPC .......... *H04L 1/0026* (2013.01); *H04W 28/06* (2013.01); *H04W 88/08* (2013.01); *H04W 92/20* (2013.01)

(56) References Cited

U.S. PATENT DOCUMENTS

| | | | |
|---|---|---|---|
| 2012/0002650 A1 | 1/2012 | Yanagisako | |
| 2012/0115469 A1* | 5/2012 | Chen | H04W 76/10 455/434 |
| 2012/0140690 A1* | 6/2012 | Choi | G01S 19/03 370/311 |
| 2012/0207025 A1* | 8/2012 | Barbieri | H04L 1/20 370/236 |
| 2013/0084865 A1* | 4/2013 | Agrawal | H04W 36/0083 455/436 |
| 2013/0114419 A1* | 5/2013 | Chen | H04L 5/0053 370/248 |
| 2013/0114434 A1* | 5/2013 | Muruganathan | H04W 16/14 370/252 |
| 2013/0142175 A1* | 6/2013 | Manssour | H04W 72/1252 370/336 |
| 2013/0170440 A1* | 7/2013 | Tavildar | H04L 5/0053 370/329 |
| 2013/0210445 A1* | 8/2013 | Nakamura | H04W 16/32 455/448 |
| 2013/0315092 A1* | 11/2013 | Yu | H04W 52/0216 370/252 |
| 2014/0293952 A1* | 10/2014 | Maniatis | H04W 72/1226 370/329 |
| 2015/0031369 A1* | 1/2015 | Gunnarsson | H04W 36/04 455/438 |
| 2015/0036602 A1* | 2/2015 | Wang | H04L 1/0026 370/329 |

FOREIGN PATENT DOCUMENTS

| | | |
|---|---|---|
| JP | 2005252627 A | 9/2005 |
| WO | 2010106836 A1 | 9/2010 |
| WO | WO 2011/136519 A2 | 11/2011 |
| WO | WO 2011/163201 A1 | 12/2011 |

OTHER PUBLICATIONS

European Pat. App. No. 12305297.9, Extended European Search Report, dated Jul. 12, 2012, 8 pp.
Ericsson et al., "Details of almost blank subframes," $3^{rd}$ Generation Partnership Project (3GPP), 3GPP TSG-RAN WG1 #62bis, R1-105335, 6 pages, XP050462815, Xian, China, Oct. 11-15, 2010.
International Search Report for PCT/EP2013/052205 dated Apr. 18, 2013.
English Bibliography for Japanese Patent Application Publication No. JP2005252627A, published Sep. 15, 2005, printed from Thomson Innovation on Oct. 1, 2015, 4 pp.
English Bibliography for PCT Patent Application Publication No. WO2010106836, published Sep. 23, 2010, printed from Thomson Innovation on Oct. 1, 2015, 3 pp.
R3-111335, Further Considerations on TDM eICIC, 3GPP TSG-RAN WG3 #72, Potevio, Barcelona, Spain, May 9-13, 2011, 2pp.
R3-111581, Further Considerations on TDM eICIC, 3GPP TSG-RAN WG3 #72, Potevio, Barcelona, Spain, May 9-13, 2011, 2 pp.
English Bibliography for Chinese Patent Application Publication No. CN102007808A, published Apr. 6, 2011, printed from Derwent Innovation on Jul. 11, 2017, 6 pp.

* cited by examiner

METHOD FOR COORDINATION OF TRANSMISSION FROM BASE STATIONS, AND A BASE STATION THEREFOR

FIELD OF THE INVENTION

The invention relates to method for coordination of transmission from a first and at least one further base station, and a base station adapted to perform said method.

BACKGROUND

In heterogeneous network (HetNet) scenarios using standards like e.g. Third Generation Partnership Project Long Term Evolution (3GPP LTE) standard, so-called pico base stations with their pico cells are placed under the coverage of a so-called macro base station. A pico base station typically covers a small area e.g. in buildings, train stations or aircrafts or outside due to its lower power, whereas a macro base station covers a larger area than a pico base station, as e.g. an outdoor area.

Heterogeneous networks often apply the concept of cell range extension (CRE) to increase the overall system performance, as e.g. spectral efficiency or cell-border throughput. In case of cell range extension, a preferably cell-specific bias is applied to each pico cell. User terminals are still served by pico cells as long as the received signal of the macro cell does not exceed the received signal of the pico cell by at least the bias value. So user terminals served by a pico base station might operate at a negative signal to interference and noise ratio (SINR) which may result in performance problems on control and data channels, as on the physical downlink control channels (PDCCH) and the physical downlink shared channels (PDSCH). To avoid these problems, in the standard 3GPP LTE Rel. 10 the so-called concept of enhanced inter-cell interference-coordination (eICIC) is introduced. In case of eICIC, the macro base station sends a predefined number of so-called almost blank subframes (ABS) during an also predefined ABS period, which only contain reference symbols. The sending of almost blank subframes by the macro base station results in a significantly reduced interference for user terminals served by the pico base station, especially for those user terminals which are affected by the cell range extension, a.k.a. cell-border user terminals, and therefore are operating at a negative SINR level. This is exploited by the pico base station scheduler by preferably scheduling its cell-border user terminals to the almost blank subframes of the corresponding macro cell. Due to the missing macro cell interference in the almost blank subframes, the cell-border user terminals normally do not have performance problems on PDCCH and PDSCH. Cell-inner user terminals of the pico base station may be scheduled to almost blank subframes or non almost blank subframes, i.e. subframes others than almost blank subframes.

SUMMARY

In case of high traffic load, the combination of CRE and eICIC leads to a significant increase of the system performance, as e.g. cell-border throughput or spectral efficiency. On the other hand eICIC shows some performance problems in scenarios with low traffic load. In case of low traffic load, the system capacity is not fully exploited. A decrease of the system performance expresses in a decrease of the average user terminal data throughput. This leads to a lower quality of experience for the users, e.g. due to longer download durations.

In case of low traffic load, not all resources within a cell might be used. There is also the possibility, that there is temporarily no traffic in some macro or pico cells. In combination with eICIC this leads to the following 2 problems, which are the reason for the performance problems of eICIC in low traffic load situations:

1. Unused almost blank subframes in pico cells: In case of low traffic load, there might temporarily be no traffic in the pico cells. In this case, there are no user terminals served by the pico base station which might profit from the reduced interference in the almost blank subframes. Although the almost blank subframes have no positive effect for the user terminals served by the pico base station, the sending of the almost blank subframes reduces the number of available resources inside the macro cell. This leads to an unnecessary performance loss for user terminals served by the macro base station. E.g. if the macro base station is configured to send 5 almost blank subframes per 10 subframes, this will reduce the peak data throughput for macro base stations by a factor of 2, even if there are no active user terminals inside the pico cells.
2. Unused non almost blank subframes in macro cells: In case of low traffic load, there might also temporarily be no traffic in the macro cell. In this case, there is no user terminal served by the macro base station which might use the resources in the non almost blank subframes, i.e. in subframes others than almost blank subframes. The pico base station schedulers assume macro cell interference in the non almost blank subframes and therefore will not schedule any of its cell-border user terminals to non-almost blank subframes. If the pico base station currently only has active cell-border user terminals this will lead to unnecessary performance loss for user terminals served by the pico base station.

In principle the eICIC performance problems at low traffic load might be addressed by self-organizing network mechanisms, which address the following aspects:

1. Automatic activation/deactivation of pico cells: In case of low traffic load, all traffic might be handled by the macro cell and the pico cells might be switched off. If all pico cells are switched off, eICIC is not required and the problem becomes obsolete.
2. Load-balancing: The traffic might be equally distributed to macro and pico cells by varying the bias of the pico cell.
3. Adaptation of the almost blank subframe pattern: Based on the traffic and user distribution between macro and pico cells the number of almost blank subframes, and subsequently the number of non almost blank subframes might be dynamically adapted. The dynamic adaptation of the almost blank subframe pattern includes the dynamic activation/deactivation of eICIC.

Said mentioned mechanisms are suitable to improve the system performance on a mid to long term basis, but they are not suitable to handle highly dynamic traffic patterns which might change on subframe basis. 1. and 2., i.e. automatic activation/deactivation of pico cells and load balancing, require handovers between macro and pico cell and 3., i.e. adaptation of the almost blank subframe pattern, requires a reconfiguration of the user terminals, as user terminals report separate measurements for almost blank subframes and non almost blank subframes, and therefore have to be informed about the current almost blank subframe pattern. If the mentioned mechanisms should be used to adapt to highly dynamic traffic patterns this would result in a high number of handovers and user terminal reconfigurations and therefore in a quite unstable system configuration.

The object of the invention is thus to propose a method for coordination of transmission from base stations with an improved data throughput and a stable system configuration.

According to embodiments of the invention, mechanisms are presented which address the problems of unused almost blank subframes and unused non almost blank subframes which lead to a performance decrease of eICIC at low traffic load. The described mechanisms are able to react on highly dynamic traffic patterns without requiring frequent system reconfigurations.

The basic idea of this invention is the avoidance of unused almost blank subframes in the pico cells and of unused non almost blank subframes in the macro cells. To enable this, the existence of unused almost blank subframes is reported to the macro base station or detected by the macro base station, and the existence of unused non almost blank subframes is reported to the pico base station or detected by the pico base station.

If an unused almost blank subframe is reported to the macro base station, the macro base station may virtually redefine the corresponding almost blank subframe to a non almost blank subframe and use them for data transfer to its user terminals, as the pico base station will not transmit to its user terminals, so that interference caused by the macro base station does not matter. If an unused non almost blank subframe is reported to the pico base station, it may virtually redefine the corresponding subframe as almost blank subframe and hence may also schedule its cell-border user terminals to this subframe, as the macro base station will not transmit on this subframe. If the traffic load is high, no unused almost blank subframe and no unused non almost blank subframe will be reported and the default eICIC scheduling is performed. Said methods according to embodiments of the invention require a time synchronization between the macro and the pico base station, which is however already required for eICIC and is thus no additional requirement.

The object is thus achieved by a method for coordination of transmission from a first and at least one further base station, wherein
said first base station evaluates the usage by said at least one further base station of at least one subframe,
and said first base station uses said at least one subframe for transmission dependent on the evaluated usage by said at least one further base station of said at least one subframe.

The object of the invention is furthermore achieved by a base station for coordination of transmission from said base station and at least on further base station, wherein the base station comprises at least one processing means which is adapted to
evaluate the usage by said at least one further base station of at least one subframe,
and use said at least one subframe for transmission dependent on the evaluated usage by said at least one further base station of said at least one subframe.

The invention is described in the following within the framework of 3GPP LTE, however as the invention is not restricted to 3GPP LTE, but can in principle be applied in other networks that need to coordinate transmissions from neighbouring base stations, like e.g. in WiMAX networks (WiMAX=Worldwide Interoperability for Microwave Access), in the following, instead of the term eNodeB used in LTE, the more general term base station is used.

Further developments of the invention can be gathered from the dependent claims and the following description.

BRIEF DESCRIPTION OF THE FIGURES

In the following the invention will be explained further making reference to the attached drawings.

DESCRIPTION OF THE EMBODIMENTS

Figure 1:
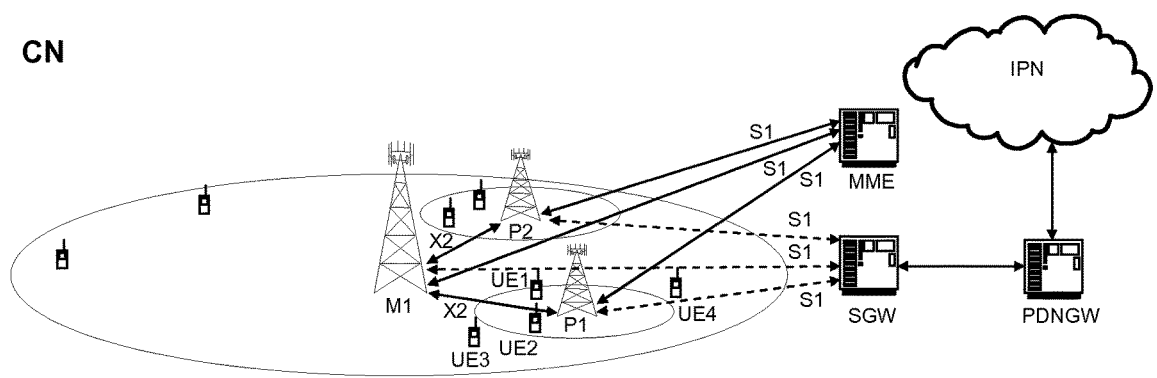
FIG. 1 schematically shows a communication network in which the invention can be implemented.

FIG. 1 shows as an example of a communication network in which the invention can be implemented a communication network CN according to the standard 3GPP LTE.

Said communication network CN comprises a macro base station M1, a first and a second pico base station P1 and P2, user terminals UE1-UE4, a serving gateway SGW, a packet data network gateway PDNGW, and a mobility management entity MME.

The user terminals UE1 and UE2 are connected via radio connections to the first pico base station P1, and the user terminals UE3 and UE4 are connected via radio connections to the macro base stations M1. In future evolutions of LTE, each of the user terminals UE3 and UE4 could also be connected via radio connections to multiple macro base stations. The Macro base station M1 is in turn connected to the serving gateway SGW and to the mobility management entity MME, i.e. to the evolved packet core (EPC), via the so-called S1 interface. In the same way, the pico base stations P1 and P2 are connected to the serving gateway SGW and to the mobility management entity MME.

The macro base station M1 and the pico base stations P1 and P2 are connected among each other via the so-called X2 interface. The macro base station M1 and the pico base stations P1 and P2 can be connected among each other via radio connections or via fixed line connections.

The serving gateway SGW is connected to the packet data network gateway PDNGW, which is in turn connected to an external IP network IPN.

The S1 interface is a standardized interface between the macro base station M1 or one of the pico base stations P1 and P2, i.e. an eNodeB in this example, and the Evolved Packet Core (EPC). The S1 interface has two flavours, S1-MME for exchange of signaling messages between one of the macro or pico base station M1, P1, P2 and the mobility management entity MME and S1-U for the transport of user datagrams between one of the macro or pico base station M1, P1, P2 and the serving gateway SGW.

The X2 interface is added in 3GPP LTE standard primarily in order to transfer the user plane signal and the control plane signal during handover.

The serving gateway SGW performs routing of the IP user data between the macro base station M1 and the pico base stations P1 and P2 respectively, and the packet data network gateway PDNGW. Furthermore, the serving gateway SGW serves as a mobile anchor point during handover either between different base stations, or between different 3GPP access networks.

The packet data network gateway PDNGW represents the interface to the external IP network IPN and terminates the so-called EPS bearer (EPS=Evolved Packet System) which is established between a user terminal UE1-UE4 and the respective serving macro base station M1 or pico base station P1, P2.

The mobility management entity MME performs tasks of the subscriber management and the session management, and also performs the mobility management during handover between different access networks.

The pico base stations P1 and P2 and the related coverage area of the pico cells are placed under the coverage area of the macro base station M1. Thus, the downlink transmission from the macro base station M1 is the dominating source of interference on the downlink transmission to the user terminals UE1 and UE2 served by the pico base station P1.

According to embodiments of the invention, methods for coordination of transmission from the macro base station M1 and the pico base stations P1 and P2 with an improved data throughput and a stable system configuration are proposed, which will be described below under FIG. 3 and FIG. 4.

Figure 2:
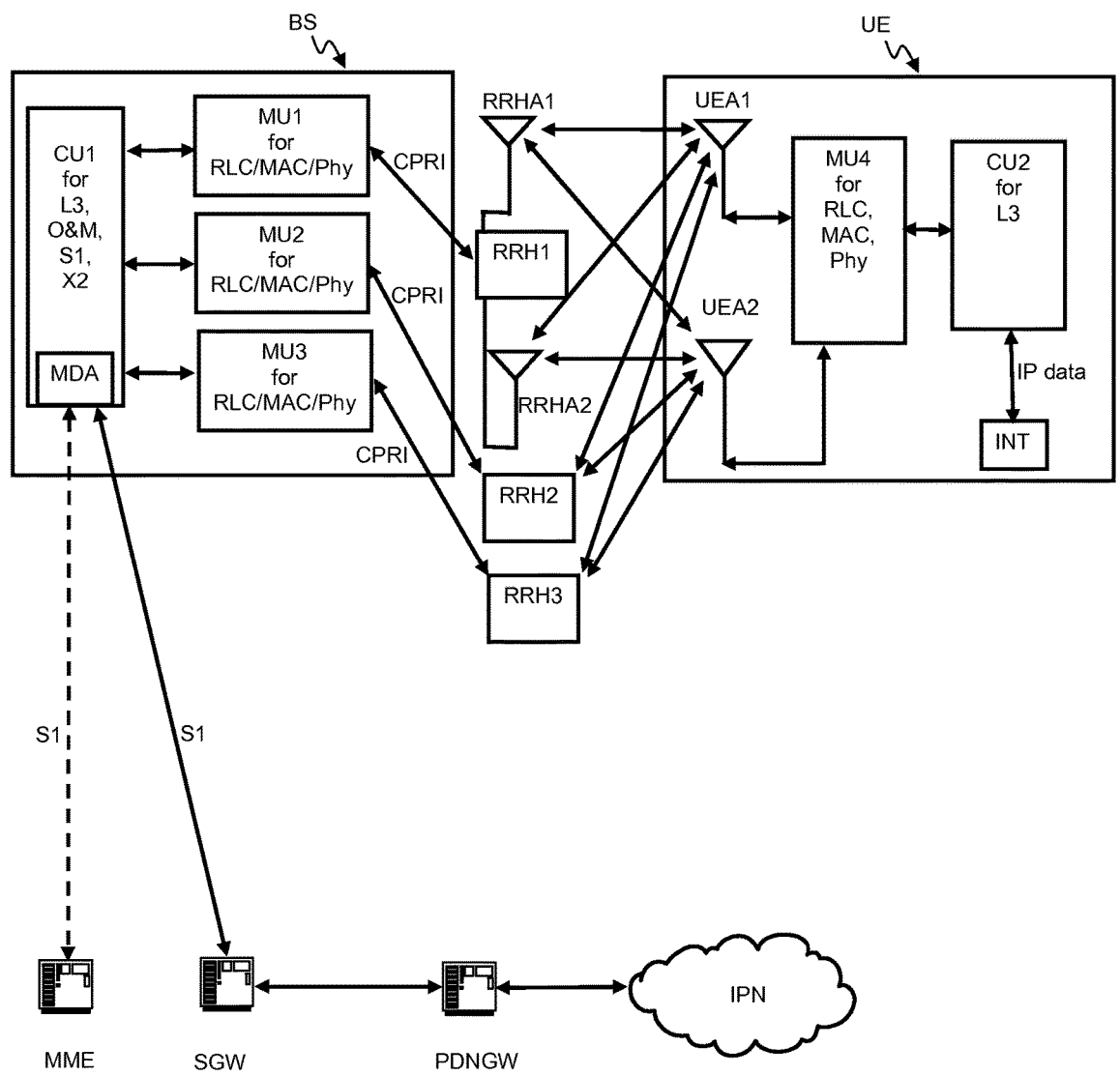
FIG. 2 schematically shows the structure of a user terminal and a base station in which the invention can be implemented.

FIG. 2 schematically shows the structure of a user terminal UE and a base station BS in which the invention can be implemented.

The base station BS comprises by way of example three modem unit boards MU1-MU3 and a control unit board CU1, which in turn comprises a media dependent adapter MDA.

The three modem unit boards MU1-MU3 are connected to the control unit board CU1, and to a respective remote radio head RRH1, RRH2, or RRH3 via a so-called Common Public Radio Interface (CPRI).

Each of the remote radio heads RRH1, RRH2, and RRH3 is connected by way of example to two remote radio head antennas RRHA1 and RRHA2 for transmission and reception of data via a radio interface. Said two remote radio head antennas RRHA1 and RRHA2 are only depicted for the remote radio head RRH1 in FIG. 2 for the sake of simplicity.

The media dependent adapter MDA is connected to the mobility management entity MME and to the serving gateway SGW and thus to the packet data network gateway PDNGW, which is in turn connected to the external IP network IPN.

The user terminal UE comprises by way of example two user terminal antennas UEA1 and UEA2, a modem unit board MU4, a control unit board CU2, and interfaces INT.

The two user terminal antennas UEA1 and UEA2 are connected to the modem unit board MU4. The modem unit board MU4 is connected to the control unit board CU2, which is in turn connected to interfaces INT.

The modem unit boards MU1-MU4 and the control unit boards CU1, CU2 may comprise by way of example Field Programmable Gate Arrays (FPGA), Digital Signal Processors (DSP), micro processors, switches and memories, like e.g. Double Data Rate Synchronous Dynamic Random Access Memories (DDR-SDRAM) in order to be enabled to perform the tasks described below.

The remote radio heads RRH1, RRH2, and RRH3 comprise the so-called radio equipment, e.g. modulators and amplifiers, like delta-sigma modulators (DSM) and switch mode amplifiers.

In downlink, IP data received from the external IP network IPN are transmitted from the packet data network gateway PDNGW via the serving gateway SGW to the media dependent adapter MDA of the base station BS on an EPS bearer. The media dependent adapter MDA allows for a connectivity to different media like e.g. fiber or electrical connection.

The control unit board CU1 performs tasks on layer 3, i.e. on the radio resource control (RRC) layer, such as measurements and cell reselection, handover and RRC security and integrity.

Furthermore, the control unit board CU1 performs tasks for Operation and Maintenance, and controls the S1 interfaces, the X2 interfaces, and the Common Public Radio Interface.

The control unit board CU1 sends the IP data received from the serving gateway SGW to a modem unit board MU1-MU3 for further processing.

The three modem unit boards MU1-MU3 perform data processing on layer 2, i.e. on the PDCP layer (PDCP=Packet Data Convergence Protocol) which is e.g. responsible for header compression and ciphering, on the RLC layer (RLC=Radio Link Control) which is e.g. responsible for segmentation and Automatic Repeat Request (ARQ), and on the MAC layer (MAC=Media Access Control) which is responsible for MAC multiplexing and Hybrid Automatic Repeat Request (HARQ).

Furthermore, the three modem unit boards MU1-MU3 perform data processing on the physical layer, i.e. coding, modulation, and antenna and resource-block mapping.

The coded and modulated data are mapped to antennas and resource blocks and are sent as transmission symbols from the modem unit board MU1-MU3 over the Common Public Radio Interface to the respective remote radio head RRH1, RRH2, or RRH3, and the respective remote radio head antenna RRHA1, RRHA2 for transmission over an air interface.

The Common Public Radio Interface (CPRI) allows the use of a distributed architecture where base stations BS, containing the so-called radio equipment control, are connected to remote radio heads RRH1, RRH2, and RRH3 preferably via lossless fibre links that carry the CPRI data. This architecture reduces costs for service providers because only the remote radio heads RRH1, RRH2, and RRH3 containing the so-called radio equipment, like e.g. amplifiers, need to be situated in environmentally challenging locations. The base stations BS can be centrally located in less challenging locations where footprint, climate, and availability of power are more easily managed.

The user terminal antennas UEA1, UEA2 receive the transmission symbols, and provide the received data to the modem unit board MU4.

The modem unit board MU4 performs data processing on the physical layer, i.e. antenna and resource-block demapping, demodulation and decoding.

Furthermore, the modem unit board MU4 performs data processing on layer 2, i.e. on the MAC layer (MAC=Media Access Control) which is responsible for Hybrid Automatic Repeat Request (HARQ) and for MAC demultiplexing, on the RLC layer (RLC=Radio Link Control) which is e.g. responsible for reassembly and Automatic Repeat Request (ARQ), and on the PDCP layer (PDCP=Packet Data Convergence Protocol) which is e.g. responsible for deciphering and header compression.

The processing on the modem unit board MU4 results in IP data which are sent to the control unit board CU2, which performs tasks on layer 3, i.e. on the radio resource control (RRC) layer, such as measurements and cell reselection, handover and RRC security and integrity.

The IP data are transmitted from the control unit board CU2 to respective interfaces INT for output and interaction with a user.

In the uplink, data transmission is performed in an analogue way in the reverse direction from the user terminal UE to the external IP network IPN.

In the sequel, methods for coordination of transmission from the macro base station M1 and the pico base stations P1 and P2 as e.g. depicted in FIG. 1 with an improved data throughput and a stable system configuration are described according to embodiments of the invention.

Figure 3:
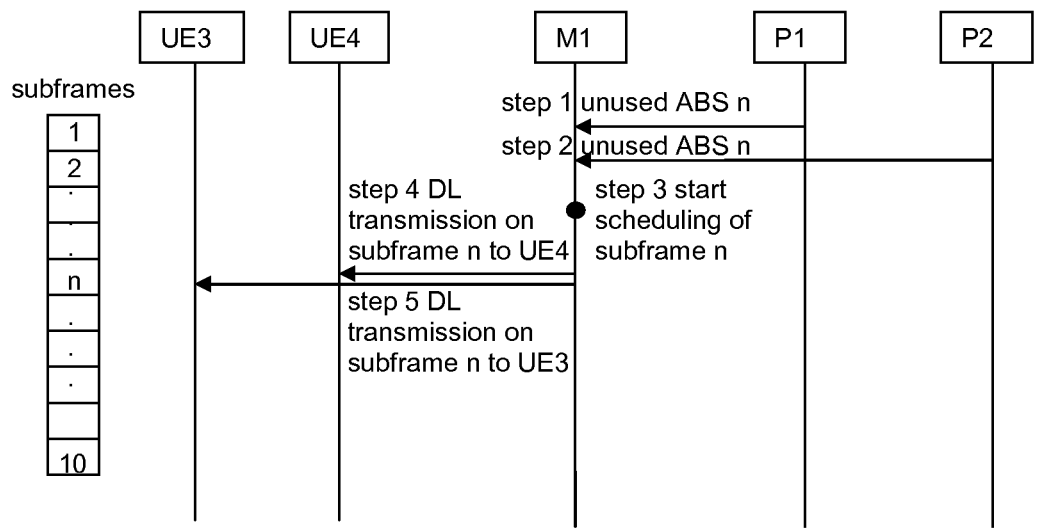
FIG. 3 schematically shows a message sequence chart for signaling unused almost blank subframes according to an embodiment of the invention.

FIG. 3 schematically shows a message sequence chart for signaling unused almost blank subframes according to an embodiment of the invention.

FIG. 3 shows the transmission of signaling messages and user data between the pico base stations P1 and P2, the macro base station M1, and the user terminals UE3 and UE4 served by the macro base station M1 as e.g. depicted in FIG. 1.

The pico base stations P1 and P2 detect that they have no traffic to send in the almost blank subframe n. Thus, the first pico base station P1 sends preferably via an X2 interface a message to the macro base station M1 indicating that the almost blank subframe n will not be used by the first pico base station P1 (step 1), and the second pico base station P2 sends preferably via an X2 interface a message to the macro base station M1 indicating that the almost blank subframe n will not be used by the second pico base station P2 (step 2). Said messages sent in step 1 and step 2 comprise an identification of the respective pico base station P1 and P2, and a subframe number or a subframe range indicating unused almost blank subframes.

If the macro base station M1 receives messages indicating that the almost blank subframe n will not be used from all active pico base stations P1, P2 inside its coverage area, the macro base station M1 may decide to treat the almost blank subframe n as a non almost blank subframe and therefore use it for data transmission to its user terminals UE3, UE4. If the macro base station M1 does not receive a message indicating that the almost blank subframe n will not be used from all active pico base stations P1, P2 inside its coverage area, it will not transmit any data in the corresponding almost blank subframe n.

In the embodiment depicted in FIG. 3, both pico base stations P1 and P2 inside the coverage area of the macro base station M1 indicate that the almost blank subframe n will not be used. As said indications of an unused almost blank subframe n are received by the macro base station before the start of scheduling of subframe n by the macro base station (step 3), the macro base station M1 schedules downlink data for transmission to its user terminals UE3 and UE4 in subframe n (step 4, step 5), although subframe n is defined as an almost blank subframe. If not all of the indications of an unused almost blank subframe n from the pico base stations P1 and P2 would be received by the macro base station before the start of scheduling of subframe n by the macro base station, then the macro base station would not transmit any data in the corresponding almost blank subframe n.

In a further embodiment of the invention, instead of the pico base stations P1 and P2 inside the coverage area of the macro base station M1 indicating that the almost blank subframe n will not be used, the macro base station M1 determines unused almost blank subframes in the pico cells. Therefore the macro base station M1 configures user terminals which are located at the cell-border to the pico-cells, as e.g. the user terminals UE3 and UE4 which are located at the cell-border to the picocell served by the pico base station P1, to temporarily perform channel quality information (CQI) feedback measurements during almost blank subframes. If the respective pico base station P1 currently does not transmit data, i.e. if there are unused almost blank subframes in the pico cell, the CQI feedback will be significantly better than in the case the pico base station P1 transmits data, i.e. in case there are no unused almost blank subframes in the pico cell. A good CQI value might be used as an indication that there are unused almost blank subframes in the corresponding pico cell. If this indication is valid for all pico cells inside the coverage area of the macro cell, i.e. if there are good CQI values for almost blank subframes for user terminals located in cell-borders for all pico cells, the macro base station M1 might transmit data in almost blank subframes. The macro base station M1 stops transmitting in almost blank subframes if the CQI feedback for at least one pico cell inside the coverage area of the macro base station M1 is below a predefined value indicating that there are no or only few unused almost blank subframes. As an alternative, the macro base station M1 stops transmitting in almost blank subframes if a block error rate for transmissions from the macro base station M1 to one of the user terminals UE3, UE4 exceeds a further predefined value.

Figure 4:
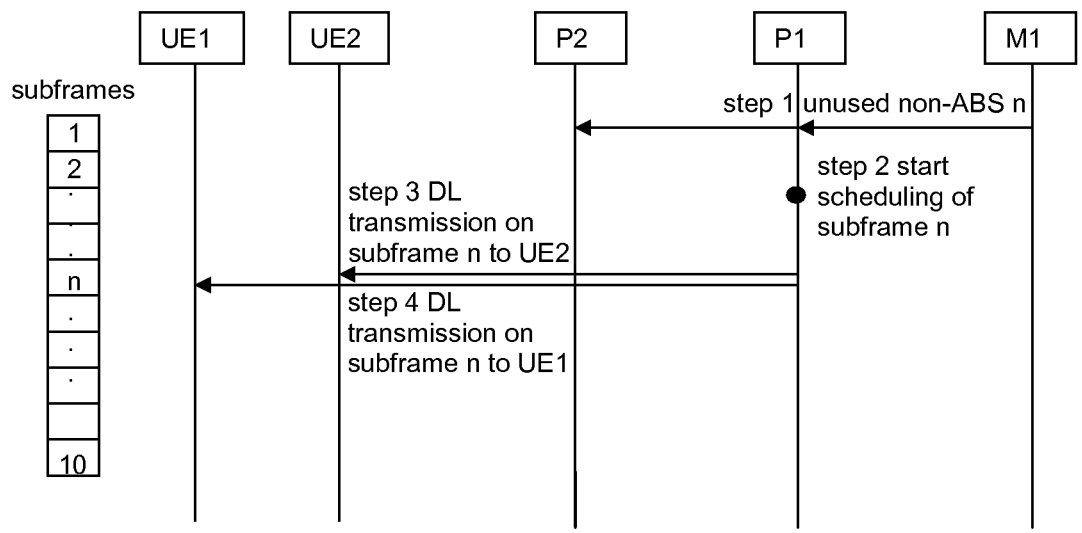
FIG. 4 schematically shows a message sequence chart for signaling unused non almost blank subframes according to an embodiment of the invention.

FIG. 4 schematically shows a message sequence chart for signaling unused non almost blank subframes, i.e. subframes others than almost blank subframes, according to an embodiment of the invention.

FIG. 4 shows the transmission of signaling messages and user data between the pico base stations P1 and P2, the macro base station M1, and the user terminals UE1 and UE2 served by the pico base station P1 as e.g. depicted in FIG. 1.

The macro base station M1 detects that it has no pending traffic to send in the non almost blank subframe n. Thus, the macro base station M1 sends preferably via an X2 interface messages to the first and second pico base station P1 and P2 inside its coverage area indicating that the non almost blank subframe n will not be used by the macro base station M1 (step 1). Said messages sent in step 1 comprises an identification of the macro base station M1, and a subframe number or a subframe range indicating unused non almost blank subframes.

The scheduler of the pico base station P1 now has the information that in the non almost blank subframe n there will be reduced interference from the corresponding macro base station M1. The pico base station P1 may treat the corresponding non almost blank subframe n as an almost blank subframe, i.e. it may schedule cell-border user terminals UE1 and UE2 to this subframe n applying the modulation and coding schemes (MCS) reported for almost blank subframes. If the pico base station P1 does not receive a message indicating that the non almost blank subframe n will not be used by the macro base stations M1, it will not transmit any data in the corresponding non almost blank subframe n.

In the embodiment depicted in FIG. 4, the macro base station M1 indicates that the non almost blank subframe n will not be used. As said indication of an unused non almost blank subframe n is received by the pico base station P1 before the start of scheduling of subframe n by the pico base station (step 2), the pico base station P1 schedules downlink data for transmission to its user terminals UE1 and UE2 in subframe n (step 3, step 4). If the indication of an unused non almost blank subframe n from the macro base station M1 would not be received by the pico base station P1 before the start of scheduling of subframe n by the pico base station P1, then the pico base station P1 would not transmit any data in the corresponding non almost blank subframe n.

In a further embodiment of the invention, the determination of unused non almost blank subframes is done implicitly, i.e. the macro base station M1 does not send a message indicating that the non almost blank subframe n will not be used by the macro base station M1. If the pico base station P1 requires, e.g. due to its traffic and user terminal distribution, more almost blank subframe resources, it may assume that the macro base station M1 currently has no traffic and starts a probing procedure. Thus, the pico base station P1 schedules user terminals to non almost blank subframes, but assumes that said subframes are almost blank subframes, i.e. the pico base station P1 uses modulation and coding schemes which were reported for almost blank subframes. If the resulting block error rate (BLER) is equal or lower than an expected BLER, e.g. 10%, then the pico base station P1 knows that its assumption was correct, i.e. that the macro base station currently has unused non almost blank subframes, and the pico base station P1 can continue scheduling user terminals to non almost blank subframes. If the resulting block error rate (BLER) is higher than the expected BLER, then the pico base station P1 knows that its assumption was wrong and that the macro base station currently has no or only few unused non almost blank subframes. The pico base station P1 may restart the probing procedure after a certain period of time.

In another embodiment of the invention, instead of the macro base station M1 indicating that the non almost blank subframe n will not be used, the pico base station P1 detects unused non almost blank subframes by sniffing the downlink signals of the macro base station M1. If the macro base station M1 does not transmit any data during a predefined period of time, the pico base station P1 might also use non almost blank subframes as almost blank subframes, i.e. schedule cell-border user terminals UE1, UE2 to non almost blank subframes, using modulation and coding schemes adapted to almost blank subframes. If the macro base station M1 restarts sending data in downlink, the pico base station P1 may assume that there are no more unused non almost blank subframes and adapts the scheduling correspondingly, i.e. stops transmitting on non almost blank subframes.

In a further embodiment of the invention, instead of the macro base station M1 indicating that the non almost blank subframe n will not be used, the pico base station P1 configures cell-border user terminals UE1, UE2 to temporarily perform CQI feedback measurements during non almost blank subframes. If the channel quality has at least a predefined value, the pico base station P1 assumes low traffic load in the corresponding macro cell and schedules cell-border user terminals UE1, UE2 in resources of non almost blank subframes. The pico base station P1 stops using non almost blank subframes for cell-border user terminals UE1, UE2, if the channel quality falls below said predefined value, or if the corresponding BLER exceeds a predefined expected BLER of, e.g., 10%.

In a further embodiment of the invention, the scheduling in the macro and pico base stations M1, P1, P2 is modified to maximize the number of reportable unused almost blank subframes in the pico cells respectively to maximize the number of reportable unused non almost blank subframes in the macro cells. Therefore periodic traffic like e.g. voice over internet protocol (VoIP) is aggregated to a minimum number of preferably periodic subframes.

The invention claimed is:

1. A method of coordinating transmissions from a pico base station for mobile communication in a communication network, the method comprising:
   evaluating usage of at least one non almost blank subframe by at least one macro base station, wherein the evaluating of the usage by the at least one macro base station is performed by a pico base station within a coverage area of the at least one macro base station; and
   using said at least one non almost blank subframe for transmissions from the pico base station dependent on the evaluated usage of the at least one non almost blank subframe by said at least one macro base station.

2. The method according to claim 1, further comprising:
   determining said usage of the at least one non almost blank subframe by said at least one macro base station based on at least one of the group of channel quality of transmissions from the pico base station and block error rate of transmissions from the pico base station, wherein the determining is performed by the pico base station.

3. The method according to claim 1, further comprising:
   receiving a report from said at least one macro base station at the pico base station, the report indicating at least one unused non almost blank subframe; and
   using said at least one unused non almost blank subframe at the pico base station as at least one additional almost blank subframe.

4. The method according to claim 2, further comprising:
   starting to use said at least one non almost blank subframe at the pica base station as at least one additional almost blank subframe; and
   continuing to use said at least one non almost blank subframe at the pica base station as at least one additional almost blank subframe as long as the block error rate of transmissions from the pico base station is below a predefined threshold.

5. The method according to claim 1, further comprising:
   listening for downlink traffic of said at least one macro base station, wherein the listening is performed by the pica base station;
   starting to use non almost blank subframes at the pico base station as additional almost blank subframes if the at least one macro base station does not send any data during a predefined period of time, and
   stopping the use of non almost blank subframes at the pica base station as additional almost blank subframes for at least one user terminal if the at least one macro base station starts sending data.

6. The method according to claim 2, further comprising:
   configuring at least one user terminal to perform channel quality measurements and to report said channel quality of non almost blank subframes, wherein the configuring is performed by the pico base station;
   starting to use non almost blank subframes as additional almost blank subframes at the pico base station if said channel quality has at least a predefined value, and
   stopping the use of non almost blank subframes as additional almost blank subframes at the pico base station for at least one user terminal on said subframes if the channel quality is below said predefined value, or if the block error rate of transmissions from the pico base station exceeds a further predefined value.

7. The method according to claim 1, wherein, in at least one of said pica base station and the at least one macro base station, periodic traffic is aggregated to a minimum possible number of subframes.

8. A pico base station configured to facilitate mobile communication in a communication network, the pico base station comprising:
- at least one processor and associated memory;
- wherein the at least one processor is configured to coordinate transmissions from the pico base station in relation to at least one macro base station;
- wherein the at least one processor is configured to evaluate usage of at least one non almost blank subframe by the at least one macro base station;
- wherein the at least one processor is configured to use said at least one non almost blank subframe for transmissions dependent on the evaluated usage of the at least one non almost blank subframe by said at least one macro base station.

9. A communication network for mobile communication, comprising:
- at least one macro base station; and
- a pico base station within the coverage area of the at least one macro base station;
- wherein the pico base station is configured to coordinate transmissions from the pico base station in relation to the at least one macro base station;
- wherein the pico base station is configured to evaluate usage of at least one non almost blank subframe by the at least one macro base station;
- wherein the pico base station is configured to use the at least one non almost blank subframe for transmissions dependent on the evaluated usage of the at least one non almost blank subframe by the at least one macro base station.

10. The pico base station according to claim 8, wherein the pico base station is configured to determine the usage of the at least one non almost blank subframe by the at least one macro base station based on at least one of the group of channel quality of transmissions from the pico base station and block error rate of transmissions from the pico base station.

11. The pico base station according to claim 10, wherein the pico base station is configured to start using the at least one non almost blank subframe as at least one additional almost blank subframe;
- wherein the pico base station is configured to continue using the at least one non almost blank subframe as at least one additional almost blank subframe as long as the block error rate of transmissions from the pico base station is below a predefined threshold.

12. The pico base station according to claim 10, wherein the pico base station is configured to configure at least one user terminal to perform channel quality measurements and to report the channel quality of non almost blank subframes;
- wherein the pico base station is configured to start using non almost blank subframes as additional almost blank subframes if the channel quality has at least a predefined value;
- wherein the pico base station is configured to stop using non almost blank subframes as additional almost blank subframes for at least one user terminal on the subframes if the channel quality is below the predefined value or if the block error rate of transmissions from the pico base station exceeds a further predefined value.

13. The pico base station according to claim 8, wherein the pico base station is configured to receive a report from the at least one macro base station indicating at least one unused non almost blank subframe;
- wherein the pica base station is configured to use the at least one unused non almost blank subframe as at least one additional almost blank subframe.

14. The pico base station according to claim 8, wherein the pico base station is configured to listen for downlink traffic of the at least one macro base station;
- wherein the pico base station is configured to start using non almost blank subframes as additional almost blank subframes if the at least one macro base station does not send any data during a predefined period of time;
- wherein the pica base station is configured to stop using non almost blank subframes as additional almost blank subframes for at least one user terminal if the at least one macro base station starts sending data.

15. The pica base station according to claim 8, wherein, in at least one of the pico base station and the at least one macro base station, periodic traffic is aggregated to a minimum possible number of subframes.

16. The communication network according to claim 9, wherein the pico base station is configured to determine the usage of the at least one non almost blank subframe by the at least one macro base station based on at least one of the group of channel quality of transmissions from the pico base station and block error rate of transmissions from the pico base station.

17. The communication network according to claim 9, wherein the pico base station is configured to receive a report from the at least one macro base station indicating at least one unused non almost blank subframe;
- wherein the pico base station is configured to use the at least one unused non almost blank subframe as at least one additional almost blank subframe.

18. The communication network according to claim 9, wherein the pico base station is configured to listen for downlink traffic of the at least one macro base station;
- wherein the pico base station is configured to start using non almost blank subframes as additional almost blank subframes if the at least one macro base station does not send any data during a predefined period of time;
- wherein the pico base station is configured to stop using non almost blank subframes as additional almost blank subframes for at least one user terminal if the at least one macro base station starts sending data.

19. The communication network according to claim 9, wherein, in at least one of the pica base station and the at least one macro base station, periodic traffic is aggregated to a minimum possible number of subframes.

* * * * *